(12) United States Patent
Battiato et al.

(10) Patent No.: US 6,823,110 B2
(45) Date of Patent: Nov. 23, 2004

(54) METHOD TO STABILIZE AND ADJUST THE OPTICAL PATH LENGTH OF WAVEGUIDE DEVICES

(75) Inventors: James M. Battiato, Austin, TX (US); James F. Brennan, III, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/874,784

(22) Filed: Jun. 5, 2001

(65) Prior Publication Data

US 2004/0052459 A1 Mar. 18, 2004

Related U.S. Application Data

(60) Provisional application No. 60/211,521, filed on Jun. 14, 2000.

(51) Int. Cl.[7] .................................................. G02B 6/34
(52) U.S. Cl. ............................. 385/37; 385/3; 385/14; 356/477; 356/478; 65/385; 65/425; 430/290; 430/321
(58) Field of Search ................................. 385/3, 14, 16, 385/37; 356/477, 478; 65/385, 425; 430/290, 321

(56) References Cited

U.S. PATENT DOCUMENTS

| | | | |
|---|---|---|---|
| 4,900,119 A | | 2/1990 | Hill et al. ................. 350/96.15 |
| 5,620,496 A | | 4/1997 | Erdogan et al. ............... 65/425 |
| 5,768,452 A | | 6/1998 | Atkins et al. .................. 385/27 |
| 5,949,542 A | * | 9/1999 | Kohnke et al. .............. 356/517 |
| 6,221,566 B1 | * | 4/2001 | Kohnke et al. .............. 430/321 |
| 6,356,681 B1 | | 3/2002 | Chen et al. .................... 385/37 |
| 6,400,870 B1 | * | 6/2002 | Hill et al. ...................... 385/39 |
| 6,442,311 B1 | * | 8/2002 | Barbarossa et al. ........... 385/37 |
| 6,601,411 B2 | * | 8/2003 | MacDougall et al. ......... 65/378 |
| 6,603,903 B1 | * | 8/2003 | Tong et al. .................... 385/37 |
| 6,706,455 B1 | * | 3/2004 | Canning et al. .............. 430/30 |
| 6,763,686 B2 | * | 7/2004 | Carpenter et al. ............. 65/413 |

FOREIGN PATENT DOCUMENTS

| | | | |
|---|---|---|---|
| DE | 19805834 A1 | 8/1999 | |
| WO | WO 00/29881 A1 | 5/2000 | ............ G02B/6/12 |
| WO | WO 01/04676 | 1/2001 | ............ G02B/6/34 |

OTHER PUBLICATIONS

S. J. Madden, et al., "High Performance Modular DWDM Implementation Based on Fibre Gragg Grating Mach Zehnder Interferometers", ADC Telecommunications, Australia.

J. Canning, et al., "Birefringence Compensation, Improved Fringe Contrast and Trimming in an Integrated Asymmetric Mach–Zehnder Interferometer using Mid–IR Laser Processing", Optical Materials 14 (2000), pp. 175–183.

(List continued on next page.)

Primary Examiner—Brian Healy
Assistant Examiner—Daniel Petkovsek
(74) Attorney, Agent, or Firm—Gregg H. Rosenblatt

(57) ABSTRACT

A method for adjusting a photosensitive optical waveguide having an optical path length to a stabilized desired optical path length. The method includes the step of changing the optical path length of the photosensitive optical waveguide by exposing at least a first portion of the waveguide to actinic radiation and creating an induced index change in the exposed first portion. The waveguide then is subjected to an annealing cycle that stabilizes the waveguide. After the step of stabilizing the waveguide, the optical path length is adjusted by subjecting at least a selected part of the exposed first portion of the waveguide to a localized heating sufficient to change the refractive index at the selected part until the desired optical path length is achieved.

18 Claims, 13 Drawing Sheets

OTHER PUBLICATIONS

F. Bakhti, et al., "*Grating–Assisted Mach–Zehnder OADM Using Photosensitive–Cladding Fibre for Cladding Mode Coupling Reduction*", Electronics Letters, Jun. 10th, 1999, vol. 35, No. 12, pp. 1013–1014.

D. Uttamchandani, et al., "*Phase Shifted Bragg Gratings Formed in Optical Fibres by Post–Fabrication Thermal Processing*", Optics Communications, 127 (1996) pp. 200–204.

F. Bilodeau, et al., "*An All–Fiber Dense–Wavelength–Division Multiplexer/Demultiplexer Using Photoimprinted Bragg Gratings*", IEEE Photonics Technology Letters, vol. 7, No. 4, Apr. 1995, pp. 388–390.

R. Kashyap, et al., "*Laser–Trimmed Four–Port Bandpass Filter Fabricated in Single–Mode Photosensitive Ge–Doped Planar Waveguide*", IEEE Photonics Technology Letters, vol. 5, No. 2, Feb. 1993, pp. 191–194.

G.E. Kohnke, et al, *Photosensitization of Optical Fiber by UV Exposure of Hydrogen Loaded Fiber*, OFC/IOOC '99 Optical Fiber Communication Conference/Int'l Conference on Integrated Optics & Optical Fiber Communication, San Diego, CA Feb. 21–26, 1999, pp. 1–3.

S. Kannan, et al, *Thermal Stability Analysis of UV–Induced Fiber Bragg Gratings*, Journal of Lightwave Technology, IEEE, New York, NY, vol. 15, No. 8, Aug. 1, 1997, pp. 1478–1483.

* cited by examiner

METHOD TO STABILIZE AND ADJUST THE OPTICAL PATH LENGTH OF WAVEGUIDE DEVICES

RELATED PUBLICATIONS

The present application relates to and claims priority from co-pending, commonly assigned, provisional application entitled Method to Stabilize and Adjust the Optical Path Length of Waveguide Devices, filed on Jun. 14, 2000, U. S. Ser. No. 60/211,521, which is hereby incorporated by reference.

BACKGROUND OF THE INVENTION

The present invention relates to a method for adjusting a photosensitive waveguide to have a desired stabilized optical path length. More specifically, the present invention provides a commercially feasible process for adjusting the optical path length of interferometer waveguide devices.

Optical path length is the distance light travels in a medium scaled by the refractive index n of the medium. The refractive index determines the speed v of an optical signal in the medium by the following equation, $$v = \frac{c}{n} \quad (1)$$

where c is the speed of light in vacuum. Optical path length (OPL) or $\Delta$ is defined by the following equation:

$$\Delta = nL \quad (2)$$

where L is the physical length of the medium. As may be appreciated from equations (1) and (2) above, the OPL of an optical waveguide may be lengthened by increasing the index of refraction of the medium or shortened by decreasing the index of refraction. Precise control of the OPL of an optical waveguide segment or an optical waveguide device becomes a crucial issue when precise timing and synchronization of signals is needed or adjustment of the phase of an optical signal in relation to another is required.

The relative phase difference, $\Phi$, between light beams at two locations, expressed as a fraction of an optical cycle, is $$\Phi = \theta_1 - \theta_2 (\mathrm{mod}\ 2\pi) \quad (3)$$

where $\theta_1$ is the wave phase of the first beam at the first location and $\theta_2$ is the phase of the second beam at the second location. In some devices such as interferometers, one is interested in the phase difference between two beams at the same location. The phase difference is related to the difference in optical path length that the two beams have traveled. If the two light beams, beam 1 and beam 2, started at the same location with the same phase (as in interferometers), then $$\theta_1 - \theta_2 = \frac{2\pi}{\lambda}(\Delta_1 - \Delta_2) \quad (4)$$

where $\lambda$ is the light wavelength in a vacuum and $\Delta_1$ and $\Delta_2$ are the optical path lengths that beam 1 and beam 2 traveled, respectively.

An interferometric device may be defined as an optical instrument that splits and then recombines a light beam, causing the recombined beams to interfere with one another. FIG. 1 illustrates the structure of a common interferometric device, a fiber Mach-Zehnder interferometer 10. The fiber Mach-Zehnder interferometer 10 includes a first input port 11, a second input port 12, a first leg 14, a second leg 16, a first output port 22, a second output port 24, a first coupler 26, and a second coupler 28. The terms input port and output port are relative, depending on the optical path length of each leg and the use of the device. Also, since the device is symmetric, the orientation of the device may be reversed.

A light signal enters either one of the two input ports, in the illustrated example of FIG. 1 through port 12. The light signal is then split into two component beams at the first coupler 26. The split beams travel independently through the two legs 14 and 16 of the interferometer. The two beams are recombined at the second coupler 28.

In most cases, it is desired to control the phase difference between the two beams at the recombination point, coupler 28. By making the phase difference equal to m*π (where m is an integer) at this point, the input power may be made to exit at mostly either one or the other output port. As shown in equation 4, this phase difference is related to the OPL difference between the interferometer legs, which may be adjusted by changing the refractive index along a portion of a leg.

One way of using the interferometer as an optical add/drop multiplexer is to add Bragg gratings into the legs of the device. The interferometer 10 may include, as illustrated in FIGS. 2 and 3, an optional first Bragg grating 18 in the first leg and an optional second Bragg grating 20 in the second leg. As illustrated in FIGS. 2 and 3, a Mach-Zehnder add/drop device may be used to insert or remove a specific wavelength from an optical signal. FIG. 2 illustrates a Mach-Zehnder having gratings 18 and 20 that reflect a signal of a specific wavelength, $\lambda_4$, which is removed or dropped out of port 12. The remaining wavelengths exit through the first output port 22. FIG. 3 illustrates the opposite function, where a signal of a certain wavelength, $\lambda_4$, is inserted or added through port 24 and the recombined multiple wavelength signal exits through port 22. A description of the manufacture and use of couplers and of wavelength selective optical devices may be found in U.S. Pat. No. 4,900,119, relevant portions of which are incorporated herein by reference. The OPL difference between the legs in this add/drop device is to be properly set such that the two beams propagating through each leg of the device will recombine at the couplers 26 and 28 with the desired phase difference.

It is apparent that even a relatively small difference in optical path lengths between the two legs of the interferometer may change the performance of the device. For instance, a ~5° error in phase difference between the two interferometer beams at the recombination coupler 28 may cause ~5% of the input energy to exit ports that it shouldn't exit, severely degrading device performance. Accordingly, in applications such as the above-described Mach-Zehnder device 10, it is important to adjust precisely the OPL difference between the device legs to control the manner in which the energy exits from the device. This is known as "optical trimming" or "trimming".

FIG. 4 illustrates common fabrication steps for creating optical fiber Mach-Zehnder devices. As seen in Step 1, the basic structure of a Mach-Zehnder interferometer is accomplished by fusing at two locations two lengths of optical fiber together until the cores are in close proximity. For some devices, it is considered important that the OPL of the two middle sections, the legs of the device, be about the same after the device is fused.

The resulting device, as seen in Step 2, may then be hydrogen loaded to increase the photosensitivity of the optical fibers. Methods for hydrogen loading optical fibers are discussed, for example, in U.S. Pat. Nos. 5,235,659 and 5,287,427 and in co-pending commonly assigned U.S. Application entitled "ACCELERATED METHOD FOR INCREASING THE PHOTOSENSITIVITY OF A GLASSY MATERIAL", U.S. Ser. No. 09/616,117, filed Jul. 14, 2000, which is hereby incorporated by reference. Other methods for hydrogen loading an optical fiber are discussed in the relevant literature. Alternatively, increasing the photosensitivity of the fiber using doping or other methods known in the art may help eliminate Step 2.

Step 3 comprises writing a grating 18 and 20 into each one of the legs of the Mach-Zehnder interferometer. The step of writing a grating is usually achieved by exposing the photosensitive fiber to a pattern of actinic radiation. The pattern may be achieved in several ways, such as with a phase mask or a holographic approach known in the art. At this point of the manufacturing process, the OPL of the Mach-Zehnder interferometer legs will likely need adjusting, for even if the original OPLs were set properly, minute differences between the inscriptions of each grating into the legs would generally cause the device performance to degrade from the desired parameters. Device performance may degrade because the optical phase difference between the beams may change with the OPL difference and cause the balance of the input energy that exits from ports to change. Accordingly, one must adjust the OPL of at least one of the legs of the device to achieve a desired device operation. Traditionally this is attempted, as illustrated in Step 4, by changing the refractive index of regions 40 of the legs by exposing them to localized fringeless ultraviolet radiation. The UV exposure increases the refractive index of the exposed portions, lengthening the OPL of that exposed region. The exposure is done repeatedly while monitoring the light signal exiting one or more output ports, until the desired device performance is achieved.

When $H_2$-loading is used to increase the photosensitivity of the exposed regions 40, the traditional OPL adjustment is complicated, since hydrogen is typically saturated throughout the device, including the entire length of the interferometer legs and the couplers. The presence of hydrogen in the couplers 26 and 28 changes the coupler performance and thus overall device performance, making OPL adjustment difficult. The presence of hydrogen in the interferometer legs also may change the refractive index of the legs and thus their OPL. As hydrogen desorbs from the device, with the passage of time and the effect of temperature, the coupler performance returns to that prior to hydrogen loading and the OPLs of the legs change. Adjustments of OPL made while the device was saturated with hydrogen may not be sufficient to ensure that the device will operate as desired after all the hydrogen desorbs.

A major shortcoming of the traditional OPL adjustment process is that the refractive index perturbations induced by ultraviolet-exposure to regions 40 are unstable, i.e. the perturbations will change with time and temperature. A device is considered "stable" if it can operate at a maximum operating temperature over a desired operating period of time without the device performance degrading beyond acceptable operating parameters. A typical maximum operating temperature that is specified commonly in the optical communication industry is 85° C. An "annealing" process, in which the optical device is subject to temperatures much higher than the maximum operating temperature for a period of time, has been found to stabilize some optical devices, especially those manufactured by employing the phenomena of photosensitivity. When the Mach-Zehnder add/drop element is annealed, the induced index perturbations in both the gratings 18 and 20 and the trim regions 40 decrease as illustrated in step 5 of FIG. 4, upsetting the OPL adjustments of the device.

Because the OPL of the interferometer legs vary uncontrollably during several manufacturing process steps, current traditional manufacture of Mach-Zehnder devices is plagued by low manufacturing yields (and accordingly higher costs and lower production efficiency). Similar problems occur when attempting to reach precisely a desired optical path length in any length of photosensitive fiber when annealing still needs to be performed.

Although a particular fiber Mach-Zehnder add/drop device has been used to illustrate the problem with present methods of adjusting OPL in waveguide devices, one skilled in the art will recognize that these OPL adjustment difficulties exist when manufacturing other waveguide devices that rely on precise OPLs to operate properly. For example, one would encounter these difficulties when making other waveguide devices, such as planar waveguide interferometers, optical ring resonators, etalons, and Michelson interferometers.

The need remains for a reliable and accurate method for manufacturing photosensitive waveguide devices having a precisely adjusted optical path length.

SUMMARY OF THE INVENTION

The present invention relates to a method for adjusting a photosensitive optical waveguide to a desired stabilized optical path length and to devices manufactured in accordance with that method. In an exemplary embodiment of the method, exposing at least a first portion of the waveguide to actinic radiation increases the optical path length of a photosensitive optical waveguide by more than is needed. The exposure creates an induced refractive index increase on the exposed first portion. The waveguide is then subjected to an annealing cycle, which stabilizes the waveguide. After the step of stabilizing the waveguide, the optical path length is adjusted by subjecting at least a part of the exposed first portion of the waveguide to localized heating at a temperature higher than the maximum operating temperature of the device and sufficient to alter the induced index change until the desired optical path length is achieved. Applying heat to select portions of the device after it has been stabilized performs the adjustment process.

In a particular embodiment of the present invention, the method comprises the step of changing the optical path length of the photosensitive optical waveguide by exposing at least a first portion of the waveguide to actinic radiation and creating an induced refractive index change in the exposed first portion. The waveguide is subjected to an annealing cycle that stabilizes the waveguide. After the step of stabilizing the waveguide, the optical path length is adjusted by subjecting at least a selected part of the exposed first portion of the waveguide to a localized heating sufficient to change the refractive index at the selected part until the desired optical path length is achieved.

The waveguide may be a silica glass optical fiber, a planar waveguide, or other suitable waveguides. The waveguide may be treated to increase its photosensitivity, such as by placing it in a hydrogen-containing environment.

The method may further include the step of writing an optical grating in a second portion of the waveguide. The step of writing an optical grating may occur before the step of stabilizing the waveguide. The step of stabilizing the waveguide includes heating the waveguide to a first temperature to stabilize the device and the step of adjusting the optical path length includes heating at least a part of the exposed first portion to a second temperature, where the second temperature is greater than the first temperature.

In another embodiment, the step of stabilizing the waveguide includes heating the waveguide to a first temperature to stabilize the device and the step of adjusting the optical path length includes heating at least a part of the exposed first portion until the desired optical path length is achieved. The step of adjusting the optical path length may further comprise contemporaneously monitoring the optical path length of the waveguide during the localized heating exposure and terminating the exposure when the desired optical path length is reached. The heating exposure may be accomplished using a $CO_2$ laser or another localized source of heat.

The method of the present invention may be applied in a variety of optical components. In an exemplary embodiment, the waveguide is a first leg of an interferometric device having at least a second leg and the step of adjusting the induced index change comprises adjusting the optical path length difference between the first leg and the second leg. The interferometer may be a Michelson, Mach-Zehnder, Sagnac, and Fabry-Perot interferometers, or other type of interferometer.

In a specific embodiment, the present invention yields an optical waveguide interferometric device having a first and a second output beams. The interferometric device has at least two interferometer legs at least one first leg having a photosensitive waveguide; an optical recombination point optically coupled to the at least one interferometer leg; and a portion of the at least one first leg having a refractive index perturbation larger by $10^{-5}$ than surrounding waveguide material. The index perturbation is stabilized to the extent that the optical path length of the first leg only changes by an amount that causes a phase difference between the first and second output interferometer beams at the optical recombination point of less than about 5° at 25° C. after the temperature of the interferometric device has been cycled up to 80° C. and returned back to 25° C.

The two interferometer legs may comprise two legs in an arrayed waveguide configuration and may include at least one Bragg grating in the at least two interferometer legs.

DETAILED DESCRIPTION OF THE INVENTION

Figure 5:
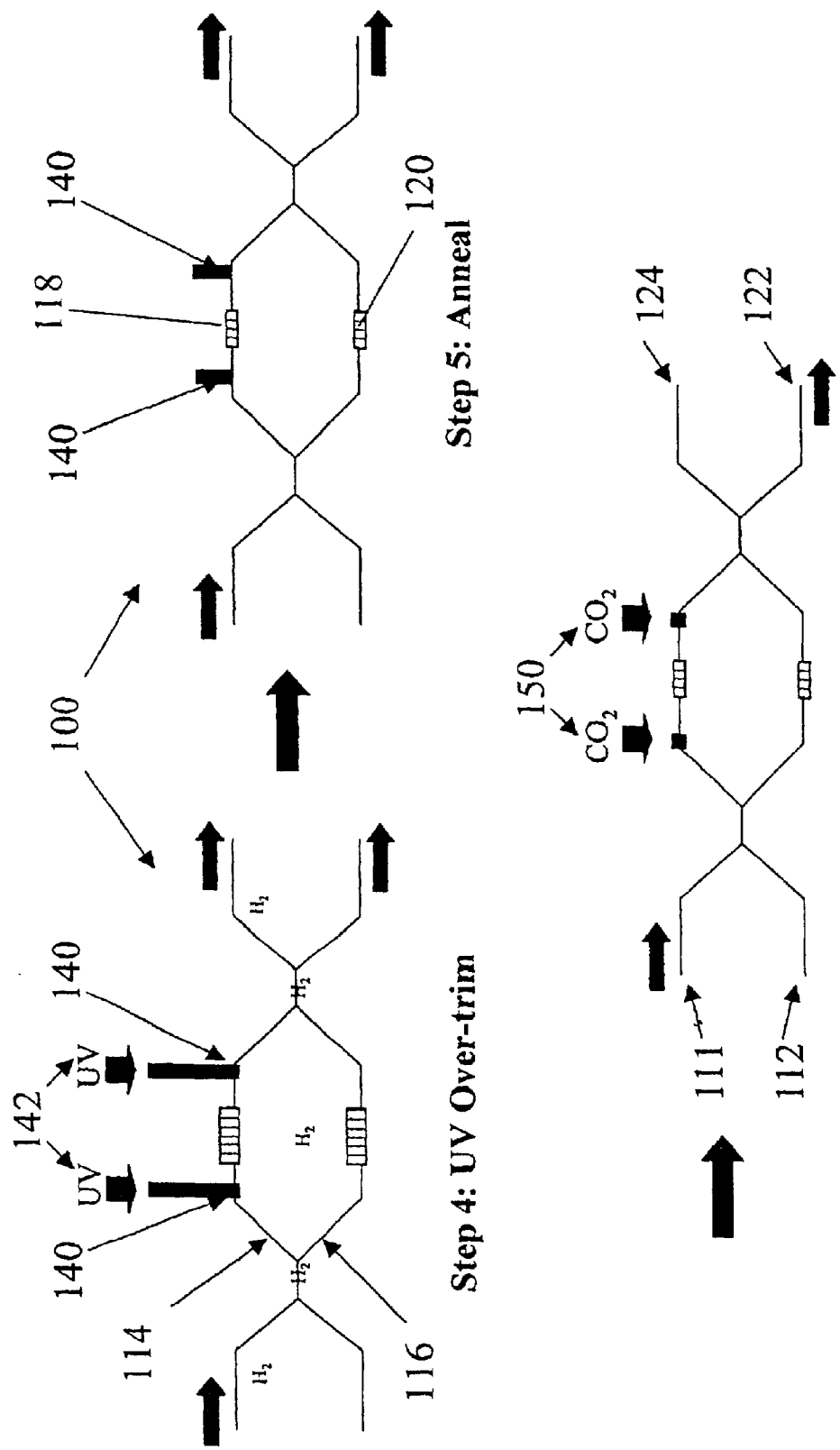
FIG. 5 is a sequential illustration of the steps of the method of the present invention.

FIG. 5 illustrates exemplary steps of the application of the method of the present invention to the manufacture of a fiber Mach-Zehnder add/drop device 100. Those skilled in the art will readily recognize that the method of the present invention may be equally applied to adjusting the path lengths of individual waveguides or a variety of optical devices, such as optical waveguide interferometers and resonators. The term waveguide as used in the present application is meant to include optical fibers, planar waveguides, and other photosensitive waveguides.

Similarly the method of the present invention is not limited to materials that exhibit an increase in index during exposure to actinic radiation, but could equally apply to materials that experience a decrease in refractive index during radiation exposure.

Figure 4:
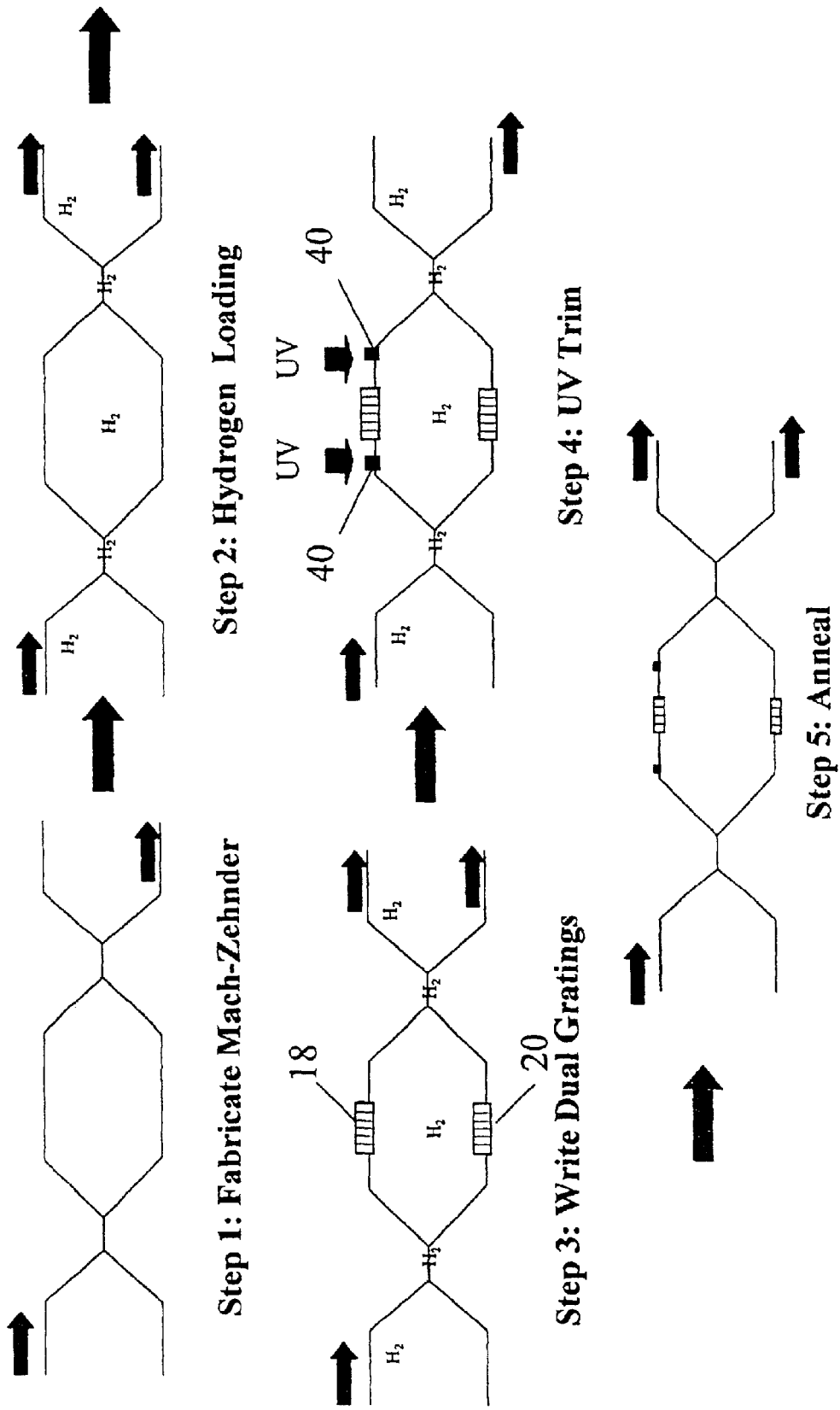
FIG. 4 is a sequential illustration of the steps of a method to manufacture a Mach-Zehnder interferometric device.

Reference is made to FIG. 4 when describing steps 1–3 of the exemplary method of the present invention, which are similar to the conventional fabrication steps. In Step 1, as described above, the basic structure of the device is accomplished by fusing two waveguides at two longitudinally spaced locations, to create the two legs 114 and 116 of the device, shown in FIG. 5. The legs 114 and 116 of the device 100 form a first optical path and a second optical path.

In a particular embodiment, the waveguides are photosensitive optical fibers. Photosensitive optical fibers are defined as fibers wherein the index of refraction of the core and/or cladding changes upon the exposure to actinic radiation. The steps for providing photosensitive optical fibers are well known to those in the art. Descriptions of fiber manufacturing processes are available readily in the literature, such as, Hecht, *Understanding Fiber Optics*, pp. 52–55 (1987), which is hereby incorporated by reference.

Referring again to FIG. 4, in contrast to current methods, while it is preferable for the first leg 114 to have generally the same optical path length as the second leg 116, the method of the present invention allows for disparate optical path lengths that may be later corrected.

In Step 2, the waveguides are hydrogen loaded by placing the interferometric device in a hydrogen gas environment to increase the photosensitivity of the optical waveguides. An exemplary exposure would be 2500 psi, at 60° C., for at least 3 days. Other methods of hydrogen loading may be used. As indicated above, in alternative embodiments this step may be replaced using other methods to increase the photosensitivity of the waveguides or omitted depending on the desired photosensitivity and the original sensitivity of the waveguides.

As illustrated in Step 3, a first grating 118 is written on the first leg of interferometric device and a second grating 120 is written on the second leg of the interferometric device.

The writing of the gratings may be accomplished using traditional methods known in the art, or by using novel methods such as those disclosed in commonly owned, co-pending U.S. patent application Ser. No. 09/161,944, which is hereby incorporated by reference. It should be understood that the method of the present invention may be used to adjust the OPL difference between the legs of a Mach-Zehnder device even if no gratings are present.

FIG. 5 illustrates the resulting Mach-Zehnder interferometric device 100 having a first leg 114, a second leg 116, a first grating 118, as second grating 120, a first input port 111, a second input port 112, a first output port 122, and a second output port 124. The exemplary Mach-Zehnder device 100 is constructed from Corning SMF28 single mode fiber. Step 4 of the method of the present invention differs from the method used in traditional trimming approaches. Rather than trying to precisely adjust the OPL difference between the legs of the device with UV exposure, the method of the present invention calls instead to create a larger index change and, in turn, a larger OPL change than is desired by exposing selected regions 140 of one or both of the legs 114 and 116 to localized actinic radiation 142. Exemplary sources of actinic radiation include continuous or pulsed UV laser radiation. The effect of the exposure may be monitored or the exposure may be preprogrammed for a desired time, intensity and region size based on the photosensitive characteristics of the waveguides. The exposure step is used to achieve a change (in magnitude, size or both) in the index of refraction that is larger than that necessary to adjust the OPL difference between the legs of the device, creating one or more "over-trimmed" regions 140.

In Step 5 of FIG. 5, the entire device 100 is annealed at a temperature higher than the maximum operating temperature. An exemplary annealing process included a time/temperature exposure in an oven for 24 hours at 120° C. The annealing process removes residual hydrogen and stabilizes the radiation-induced gratings 118 and 120 and the over-trimmed regions 140.

Once the device is stabilized, as illustrated in Step 6 of FIG. 5, a discrete and localized heat source, such as a $CO_2$ laser beam, is used to selectively heat at least a portion of the over-trimmed region 140 at a temperature above the maximum operating temperature of the device and sufficient to change the refractive index at the location. The heating device 150 locally heats at least a portion of the trim region 140 to remove some of the induced index change until the desired optical path length is achieved. The index change maybe monitored in a real-time fashion, using a monitoring system such as that illustrated in FIG. 10. Those skilled in the art will recognize that resulting device is stable.

Figure 6:
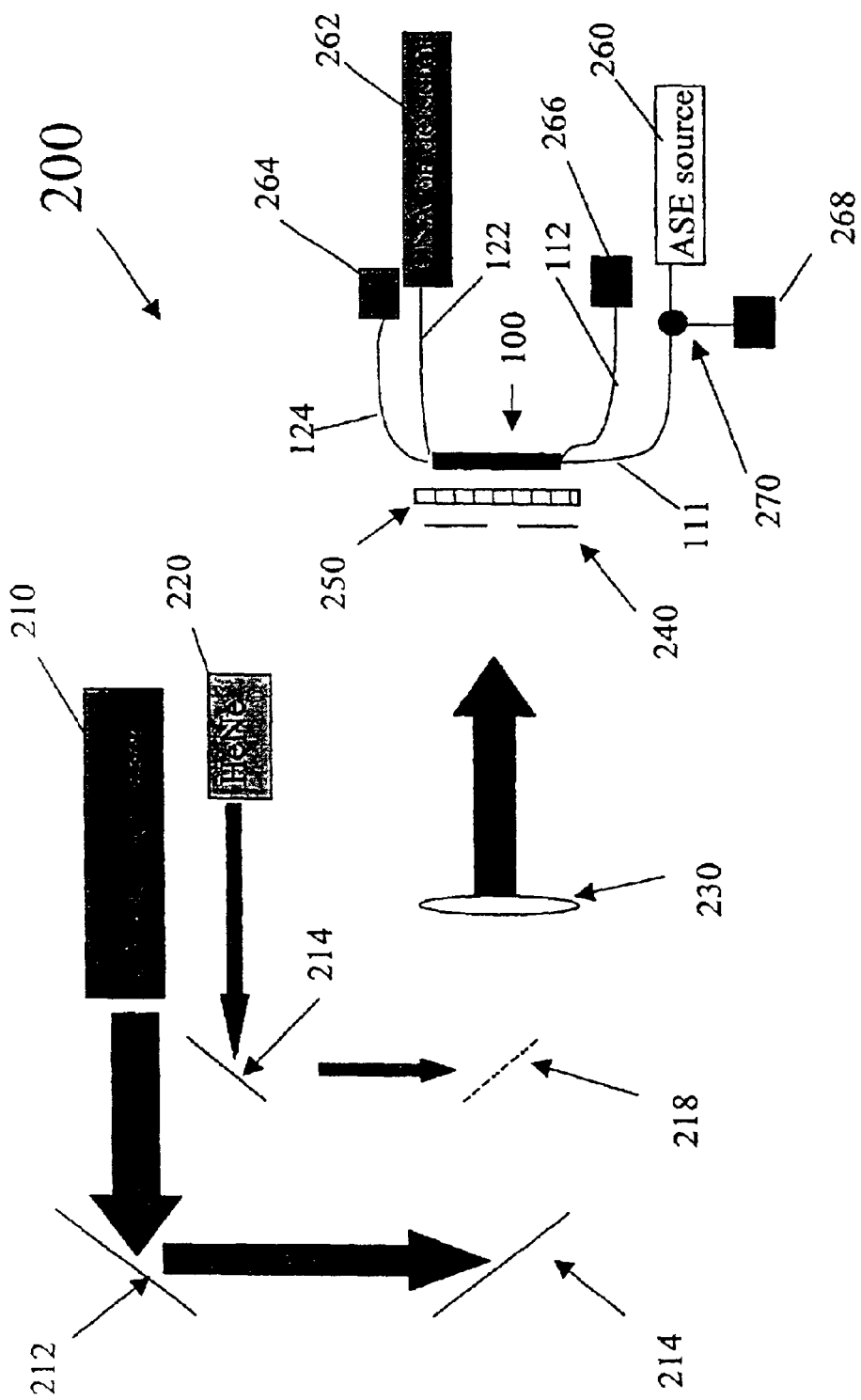
FIG. 6 is a schematic diagram of the manufacturing apparatus for UV over-trimming and/or grating writing in accordance with the present invention.

FIG. 6 illustrates a trimming and monitoring assembly 200 for carrying out the method of the present invention. The assembly 200 includes a source of actinic radiation 210, such as a UV excimer laser. A HeNe laser 220 is used for alignment purposes. A cylindrical lens 230 is used to focus the beams from sources 210 and 220. Mirrors on kinematic mounts 212–218 are used to direct the laser beams from sources 200 and 220. A slit 240 is used to limit the optical beam size and a phase mask 250 is used to write the fiber grating. A broad-band source 260, such as an amplified spontaneous emission source (ASE), is coupled to the first input port 111 and is used to provide a signal into the interferometric device 100. An optical spectrum analyzer (OSA) 262 monitors the formation of the gratings in the device. Optical detectors 264, 266 and 268 monitor the output of each port 124, 112 and 111 respectively. A circulator 270 is used to couple both the detector 268 and the ASE source 260 to the first input port 111. In the present exemplary system, an $Er^+$ doped optical fiber is pumped with a 980 nm optical source and is used as the ASE source.

Figure 7:
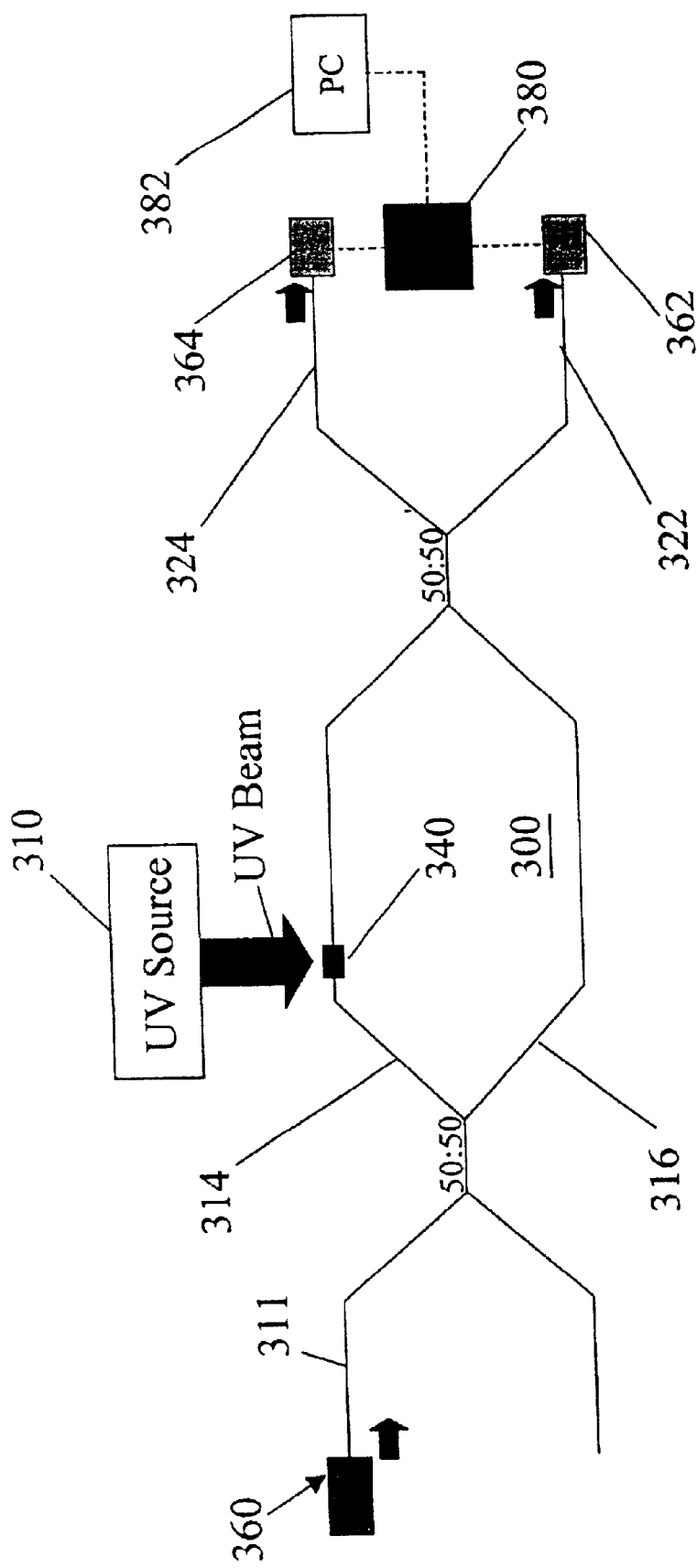
FIG. 7 is a schematic diagram of the monitoring apparatus and method used to monitor the UV over-trim step in accordance with the present invention.

FIG. 7 illustrates an exemplary trimming process for a Mach-Zehnder interferometric device 300 without gratings in accordance with the method of the present invention. A non-transmissive mask was used to block one leg 316 so it would not be subjected to the actinic radiation. A portion 340 of the other leg 314 was exposed to a UV beam from a Lambda Physik L-1000 excimer laser 310 lasing at 248 nm. The exposure energy was between 100–200 $mJ/cm^2$. A laser source 360, such as a Newport laser diode (model LD-1550-21B), is connected to a first input port 311 of the interferometric device 300. Both output ports 322 and 324 are monitored with optical detectors 362 and 364, such as a Newport universal fiber optic detectors (model 818-IS-1), as one leg of the device is over-trimmed via UV exposure. The optical detectors 362 and 364 are coupled to a Newport dual channel optical power meter (model 2835C) 380. Data acquisition is performed using a general purpose interface bus (GPIB) to couple the meter 380 to a personal computer 382. The effect of the UV "over-trim" on the interferometer output was monitored by injecting light from the laser diode 360 into the input port 311 of the MZI 300 and monitoring the signal on the output ports 322 and 324 of the MZI. Alignment of the mask was visually confirmed, such as by using a CCD camera and monitor (not shown). Exposure times varied.

Figure 8:
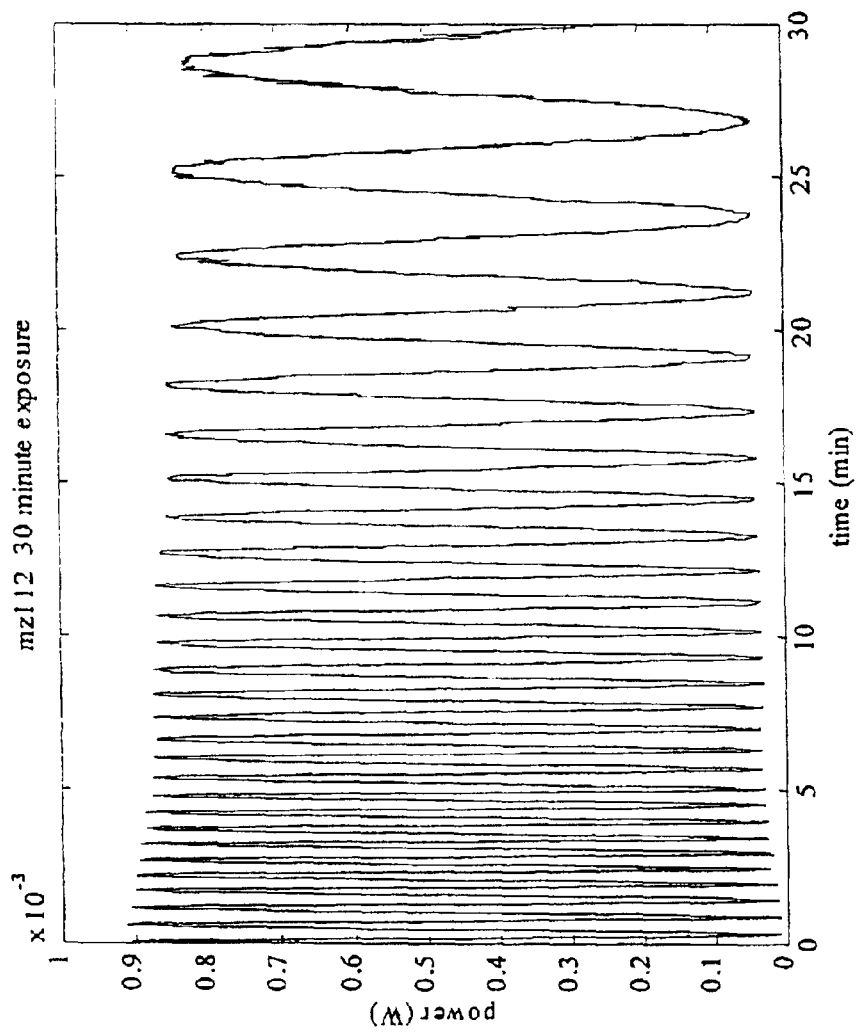
FIG. 8 is a graph illustrating exemplary experimental results of over-trimming a Mach-Zehnder.

FIG. 8 is a graph illustrating the resulting exemplary experimental results of a thirty-minute exposure over-trimming a Mach-Zehnder. The graph shows the optical power output on one of the legs of the interferometer during the UV over-trim and the change in one output of the device as index is added to one leg. As the relative phase difference (proportional to path length difference via equation (4)) cycles through $2\pi$, the output power cycles between the device outputs.

Figure 9:
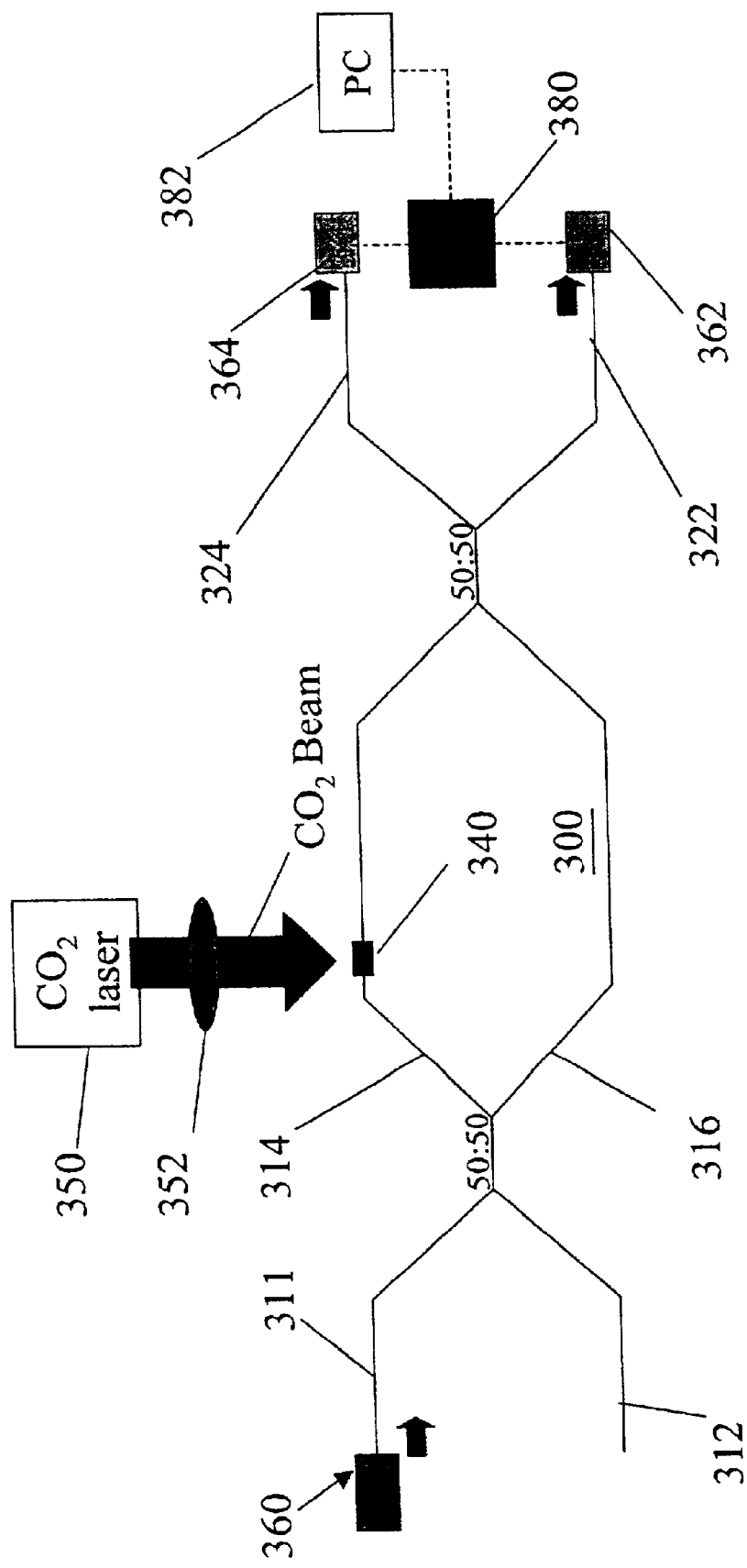
FIG. 9 is a schematic diagram of the monitoring apparatus and the method used to adjust and monitor the OPL difference in the legs of a Mach-Zehnder device.

FIG. 9 illustrates schematically the apparatus for adjusting the optical path length of the MZI 300. An exemplary step included use of a localized heat source 350, such as a 25 Watt Synrad $CO_2$ laser (model J48-25W-5714). The beam was expanded 5× and focused onto the regions 340 using a 50 mm focal length cylindrical lens 352.

The device 300 was placed approximately 70 mm behind the cylindrical lens. A broadband $Er^+$ source was input into a Michelson fiber interferometer. The output from the Michelson is a narrow spectral slice of the broad $Er^+$ source, which was used as the input into the MZI to be adjusted. The signal on the output ports of the MZI were monitored with a Newport dual channel optical power meter (model 2835C) and two Newport universal fiber optic detectors (model 818-IS-1.) as shown in FIG. 9.

Figure 10:
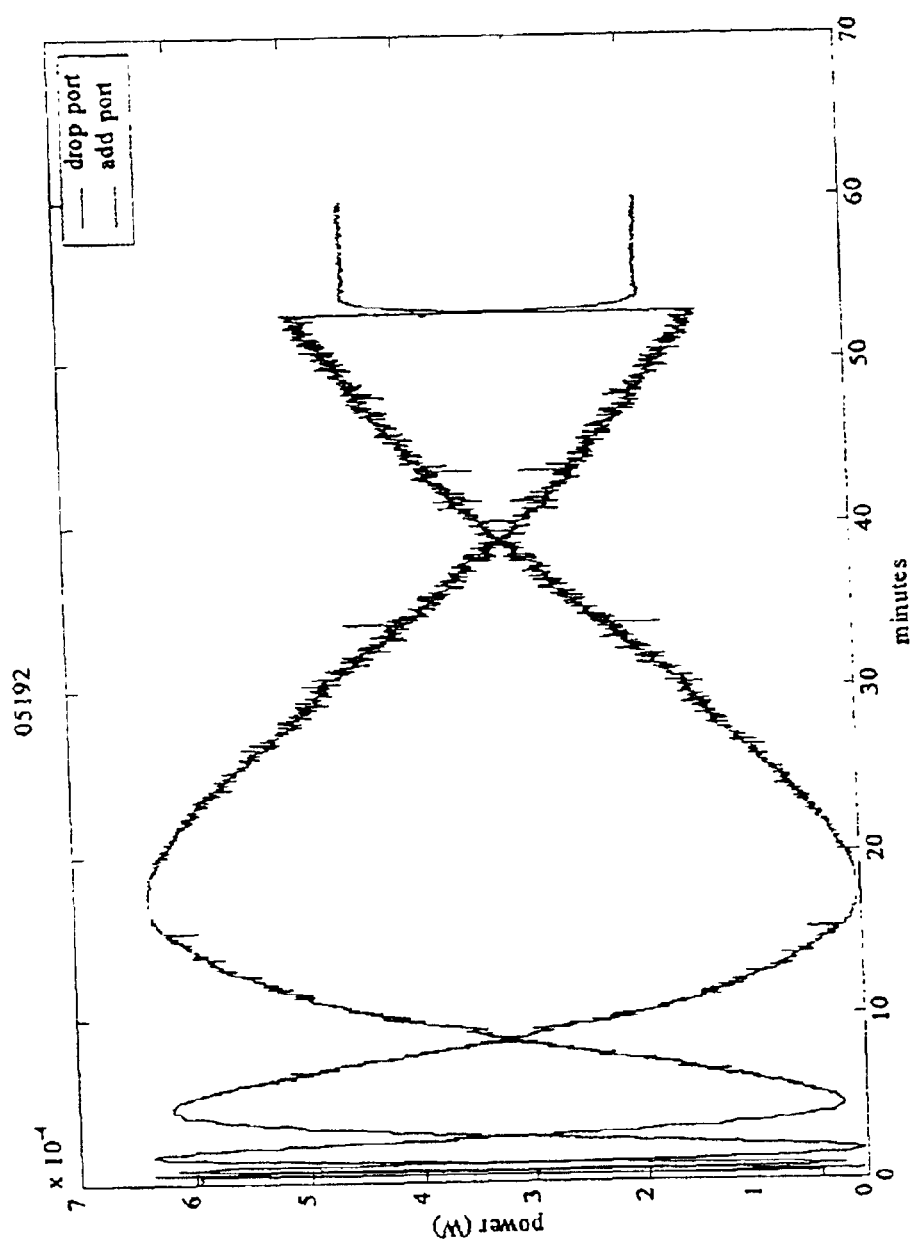
FIG. 10 is a graph showing the exemplary experimental results of adjusting the OPL difference in the legs of a Mach-Zehnder device.

The $CO_2$ laser heated a portion of the legs of the MZI to 300° C. The exposure time was continuous and approximately fifty (50) minutes. The $CO_2$ laser "subtracted" index from the trim region resulting in the cyclical shift of power between the two output legs of the device. FIG. 10 is a graph showing the exemplary experimental results of adjusting the OPL difference between the legs of a Mach-Zehnder. The graph shows the change in one output port of the device as index is subtracted from one leg of the device. As with the UV over-trim, the relative phase difference (proportional to path length difference via equation (4)) cycles through $2\pi$ and the output power cycles between the device outputs. In this example, however, the change is due to the subtraction of index from the device as opposed to the addition of index as in the UV over-trim.

Figure 13:
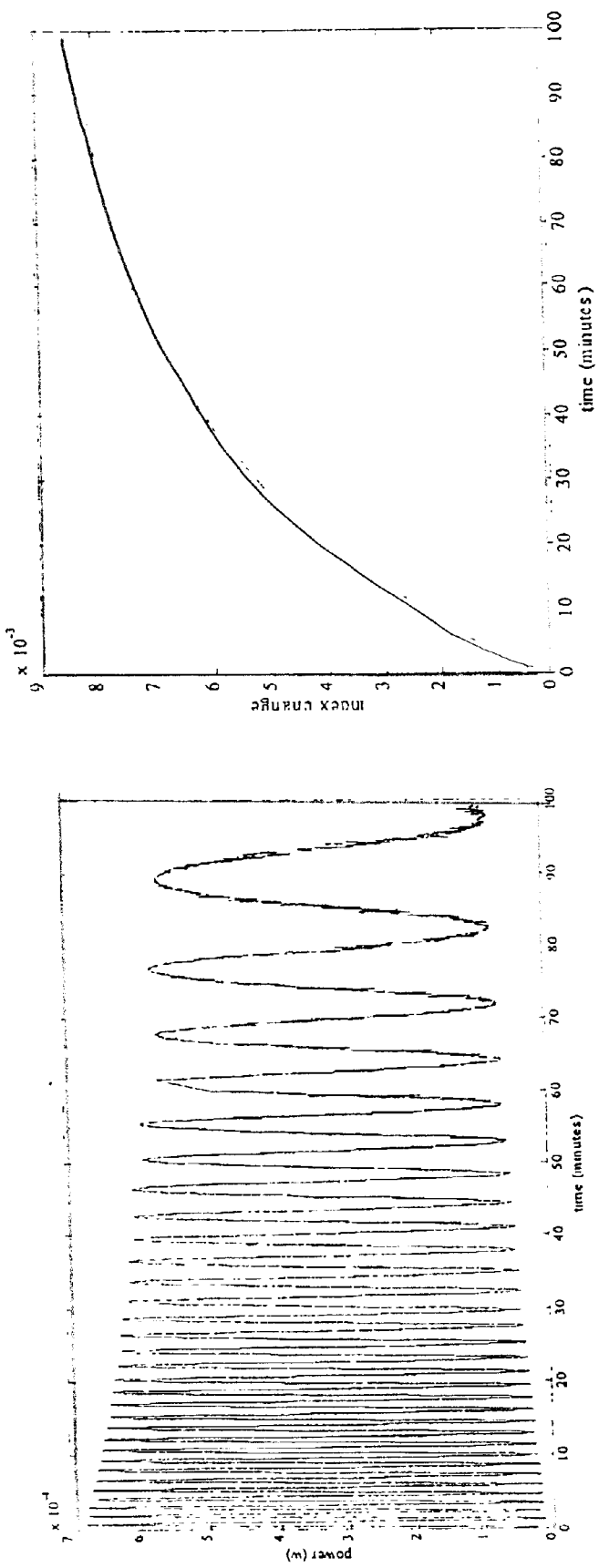
FIG. 13A is a graph illustrating the resulting exemplary experimental results of a 100-minute exposure overtrimming a Mach-Zehnder.
FIG. 13B is a plot of the change in refractive index vs. time for this 100-minute exposure.

The present technique may be contrasted to methods where interferometers are trimmed with a localized intense heat source without prior actinic irradiation. The method of this invention allows for a larger adjustment of index since a substantial change in the index may be induced prior to the heat treatment via actinic radiation exposure as shown in FIG. 13. FIG. 13A is a graph illustrating the resulting exemplary experimental results of a 100-minute exposure over-trimming a Mach-Zehnder. The graph shows the optical power output on one of the legs of the interferometer during the UV over-trim and the change in one output of the device as index is added to one leg. As the relative phase difference, (proportional to path length difference via equation (4)), cycles through $2\pi$ the output power cycles between the device outputs. From equation (4), for an over-trim region which is 6 mm in length and at a wavelength of 1550 nm, each cycle represents a change in the refractive index of $2.58 \times 10^{-4}$.

FIG. 13B is a plot of the change in refractive index vs. time for this 100 minute exposure. As illustrated in the figure, a large index change was achieved with hydrogen loaded SMF28 fiber. The amount of index change will vary with fiber type and its photosensitivity. This large index change may then be decreased to attain the desired path length via the method of this invention.

Figure 11:
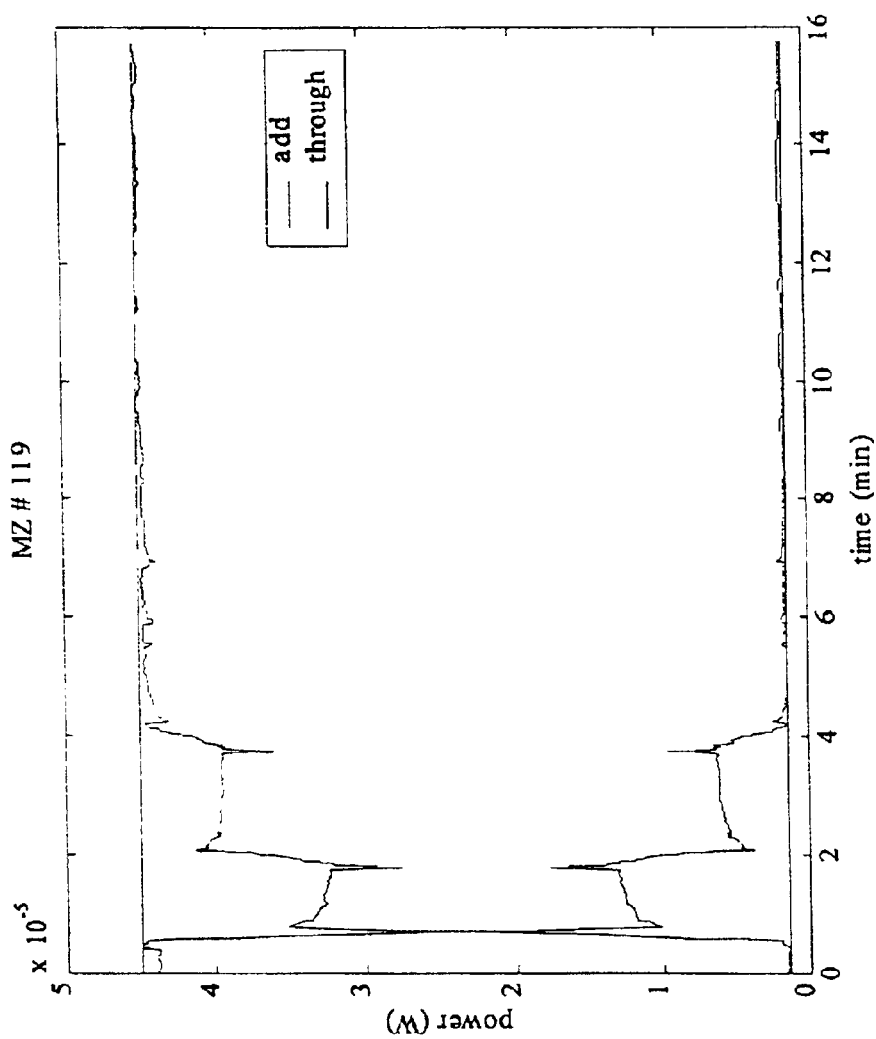
FIG. 11 is a graph showing the exemplary experimental results of adjusting the OPL difference in the legs of a Mach-Zehnder device such that all the input power is output on a single output port.

FIG. 11 is a graph illustrating an exemplary result of actually setting the output state of a Mach-Zehnder interferometer using the same setup as FIG. 9. In this case, it was desired to adjust the OPL difference between the legs of the interferometer such that the power was all output on one output port. The two curves represent the power at each output port as measured by the optical detectors. As may be appreciated in the figure, the method was used to adjust the relative phase difference between the two legs of the interferometer in a controlled fashion resulting in a stable device with all input power exiting into one output.

It may be appreciated by those skilled in the art that the adjustment of an interferometric device may be accomplished by matching the optical path lengths between the legs of the device, or in the alternative, by appropriately adjusting the optical path lengths of the legs such that they are in a desired phase with respect to each other (by a factor of modulo $2\pi$). By doing this, devices having precise predetermined output power distributions may be created.

Figure 1:
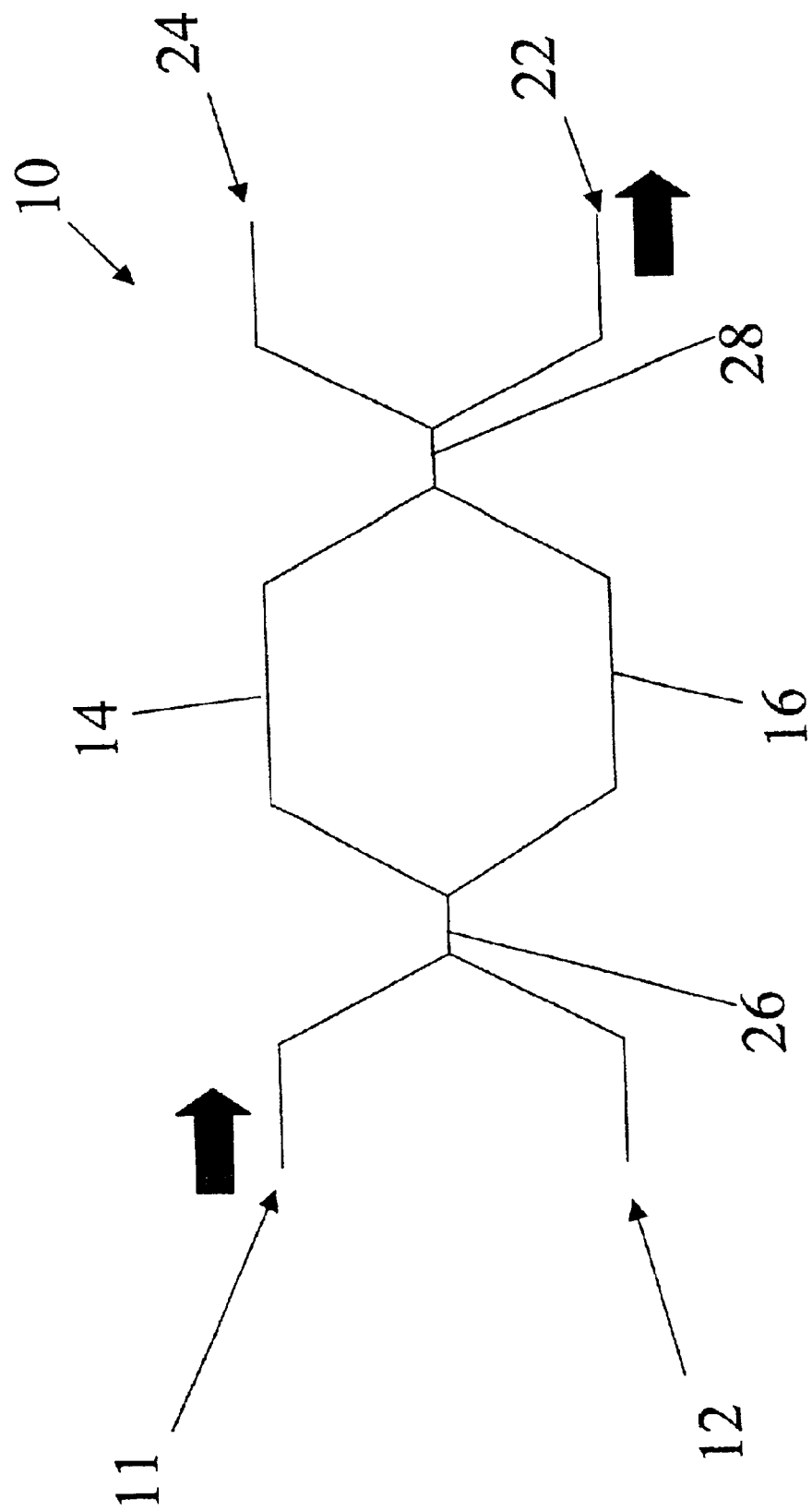
FIG. 1 is a simplified representation of a Mach-Zehnder interferometric device.
Figure 2:
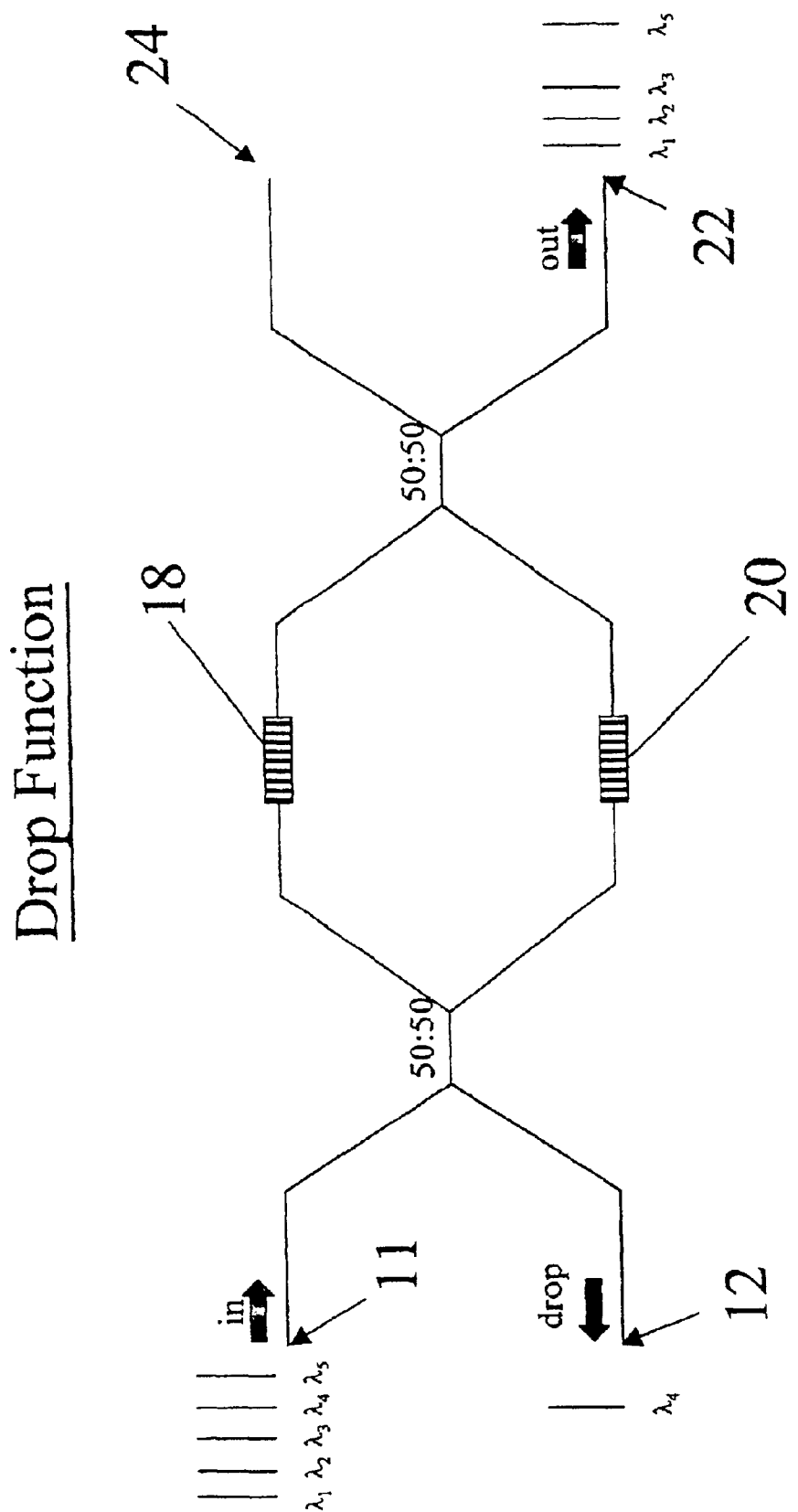
FIG. 2 is a simplified representation of a Mach-Zehnder add/drop device, illustrating the drop function
Figure 3:
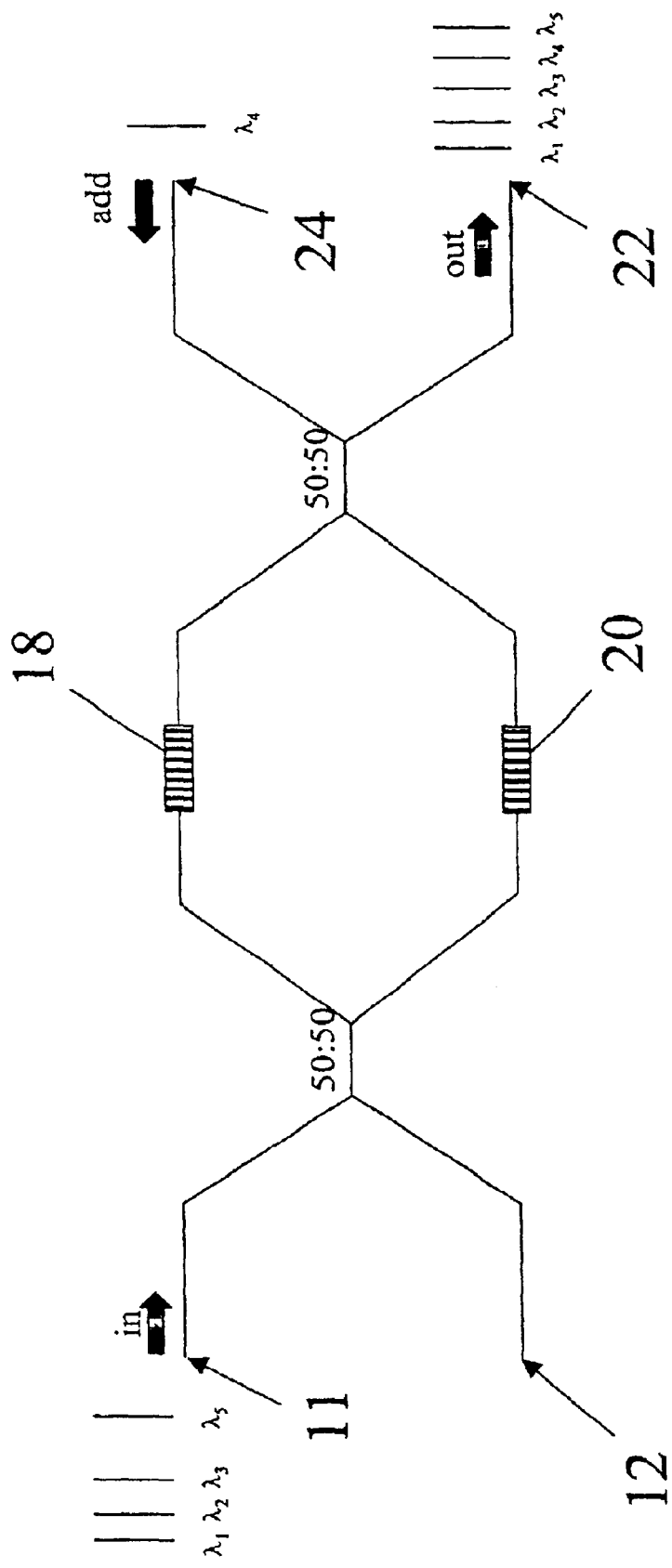
FIG. 3 is a simplified representation of a Mach-Zehnder add/drop device, illustrating the add function

The method of the present invention may be used in any other applications where precise control of the optical path length of a photosensitive waveguide is desired. Those skilled in the art will appreciate that the present invention may be used to adjust the optical path length of a variety of photosensitive waveguides, waveguide interferometric devices, waveguide resonator devices, interleavers, and other optical devices, such as a Michelson interferometer (an example of which is the first half of the Mach-Zehnder add/drop device shown in FIG. 2), an etalon, a Sagnac interferometer, true time delay devices, and time division multiplexers.

As an illustration of the method of the present invention to create stable adjustments to the OPL of resonator optical devices, the application of the present method to fabricate a stable precisely-adjusted waveguide etalon is detailed. Note that the interferometer illustrated may also be applied in Michelson, Mach-Zehnder (both symmetric and asymmetric), Sagnac, and fabry-Perot interferometers.

Figure 12:
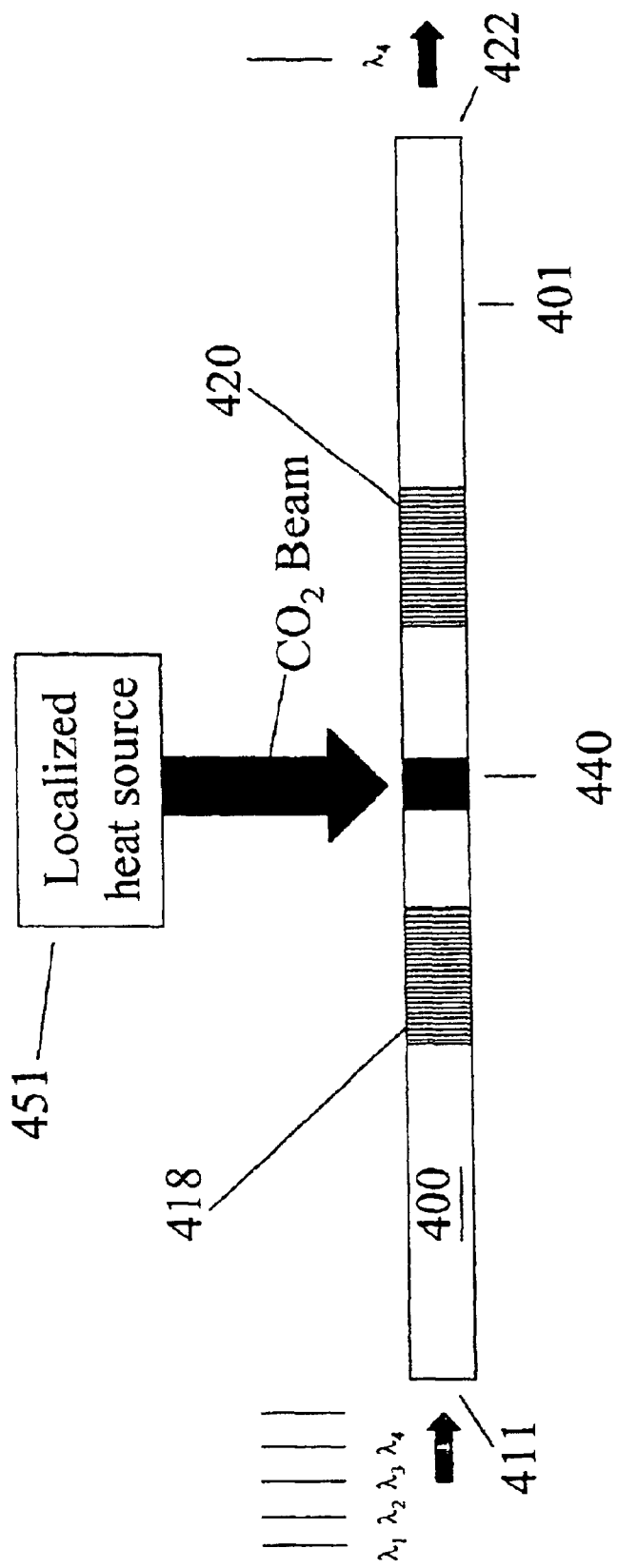
FIG. 12 is a simplified representation of fabricating a Fabry-Perot interferometer in accordance with the present invention.

The present inventive method may be used to fabricate a stable waveguide etalon device with a desired spectral output as illustrated in FIG. 12. The assembly 400 includes an optical waveguide 401 with input port 411 and output port 422. Two gratings 418 and 420 form an optical resonator in the etalon. With the methods of the present invention, the region between the gratings is over-trimmed 440 and the device is annealed as discussed in the previous example. In the same manner, a localized heat source 451 is used to adjust the optical path length between the gratings, and in turn, adjust the optical response of the device.

The method of the present invention allows for the fabrication of a stable interferometric device having a desired power distribution. FIG. 9 illustrates the results for an optical waveguide interferometric device, manufactured in accordance with the method described above, having a first and a second output beams. The interferometric device comprises at least two interferometer legs at least one first leg having a photosensitive waveguide. An optical recombination point optically couples the interferometer legs. In the particular embodiment, the two interferometer legs are arranged in an arrayed waveguide configuration. One or both of the legs has at least one Bragg grating written on it.

A portion of the first leg has a refractive index perturbation larger by $10^{-5}$ than surrounding waveguide material. The index perturbation is stabilized to the extent that the optical path length of the first leg only changes by an amount that causes a phase difference between the first and second output interferometer beams at the optical recombination point of less than about 5° at 25° C. after the temperature of the interferometric device has been cycled up to 80° C. and returned back to 25° C.

While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A method for adjusting a photosensitive optical waveguide having an optical path length to a stabilized desired optical path length, the method comprising the steps of:

a) changing the optical path length of the photosensitive optical waveguide by overexposing at least a first portion of the waveguide to actinic radiation and creating an induced refractive index change in the exposed first portion;

b) subjecting the waveguide to an annealing cycle that stabilizes the waveguide;

c) after the step of stabilizing the waveguide, adjusting the optical path length by subjecting a selected part of the exposed first portion of the waveguide, said selected part being less than the exposed first portion, to a localized heating sufficient to reduce the refractive index at the selected part until the desired optical path length is achieved, wherein the step of stabilizing the waveguide comprises heating the waveguide to a first temperature to stabilize the device and the step of adjusting the optical path length includes heating the selected part of the exposed first portion to a second temperature wherein the second temperature is greater than the first temperature.

2. The method of claim 1, wherein the photosensitive waveguide comprises a glass waveguide which has been hydrogen loaded.

3. The method of claim 1, further comprising the step of writing an optical grating in a second portion of the waveguide.

4. The method of claim 3, wherein the step of writing an optical grating occurs before the step of stabilizing the waveguide.

5. The method of claim 1, wherein the waveguide is a first leg of an interferometric device having at least a second leg and the step of adjusting the induced index change comprises adjusting the optical path length difference between the first leg and the second leg.

6. The method of claim 1, wherein the step of adjusting the optical path length further comprises contemporaneously monitoring the optical path length of the waveguide during the localized heating exposure and terminating the exposure when the desired optical path length is reached.

7. The method of claim 1, wherein the step of adjusting the optical path length by subjecting the selected part of the exposed first portion of the waveguide includes heating the selected part of the exposed first portion using a $CO_2$ laser.

8. A method for making a stabilized photosensitive optical waveguide having a desired optical path length, the method comprising the steps of:
   a) providing a photosensitive waveguide;
   b) changing the optical path length of the waveguide by overexposing at least a first portion of the waveguide to actinic radiation and creating an induced refractive index change on the exposed portion;
   c) stabilizing the waveguide via an annealing cycle;
   d) after the step of stabilizing the waveguide, reducing the induced index change on the exposed first portion to achieve the desired stable optical path length by locally heating a selected part of the exposed first portion of the waveguide that is less than the exposed first portion, wherein the step of annealing the waveguide comprises heating the waveguide to a first temperature to stabilize the device and reducing the induced index change includes heating the selected part of the exposed first portion to a second temperature wherein the second temperature is greater than the first temperature.

9. The method of claim 8 wherein the step of providing a photosensitive waveguide comprises providing a glassy waveguide and hydrogen loading the glassy waveguide.

10. The method of claim 8, further comprising the step of writing an optical grating in a second portion of the waveguide before annealing the waveguide.

11. The method of claim 8, wherein the step of reducing the induced index change includes irradiating a discrete section of the exposed first portion of the waveguide using a $CO_2$ laser.

12. A method for tuning and balancing an optical waveguide interferometric device, the method comprising the steps of:
   a) providing a waveguide interferometric device having at least a first optical path and a second optical path;
   b) overexposing at least a first portion of the first path to a blanket exposure of actinic radiation;
   c) annealing the first optical path to stabilize the device;
   d) reducing the optical path length of the first optical path by locally heating a selected part of the first portion of the first optical path that is smaller than the exposed first portion until the desired optical path length is achieved, wherein the step of stabilizing the first optical path comprises heating the first optical path to a first temperature to stabilize the device and the step of adjusting the optical path length includes heating the selected part of the exposed first portion to a second temperature wherein the second temperature is greater than the first temperature.

13. The method of claim 12, wherein the step of adjusting the optical path length comprises adjusting the relative phases between the first and the second optical path.

14. The method of claim 12, further comprising applying steps b–d to the second optical path.

15. The method of claim 12, further comprising the step of writing an optical grating in at least one of the optical paths.

16. An interferometer manufactured in accordance with the method of claim 12.

17. The interferometer of claim 16, wherein the interferometer is selected from the group consisting of Michelson, Mach-Zehnder, Sagnac, and Fabry-Perot interferometers.

18. The interferometer of claim 17, wherein the waveguide is selected from a group consisting of an optical fiber and a planar waveguide.

* * * * *